United States Patent Office 3,324,435
Patented June 6, 1967

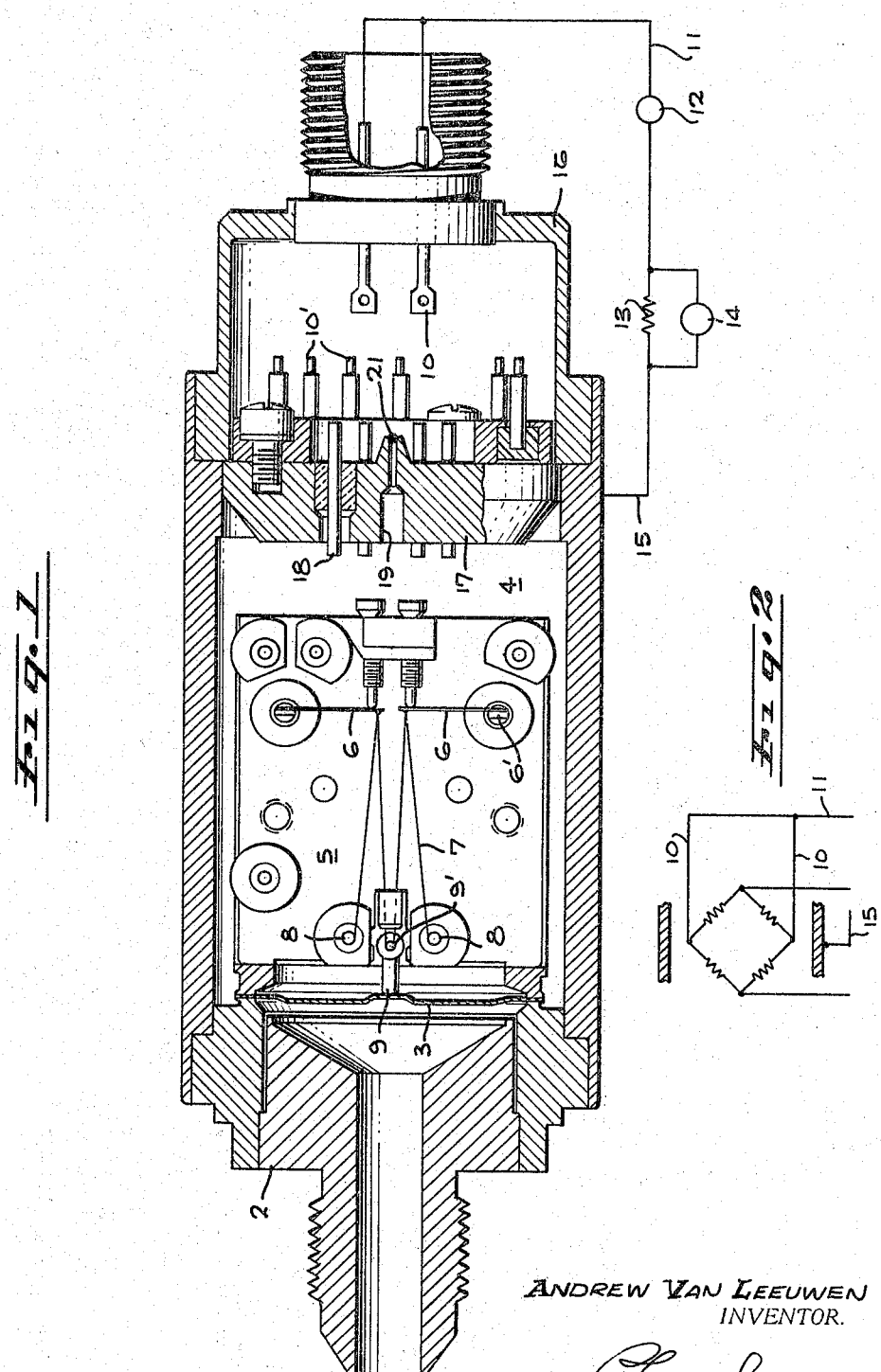

3,324,435
VOLTAGE BREAKDOWN CONTROL IN STRAIN GAGES
Andrew Van Leeuwen, Los Angeles, Calif., assignor to Statham Instruments, Inc., Los Angeles, Calif., a corporation of California
Continuation of abandoned application Ser. No. 460,158, June 1, 1965. This application Oct. 20, 1966, Ser. No. 588,223
9 Claims. (Cl. 338—4)

This application is a continuation of application Ser. No. 460,158, filed June 1, 1965, now abandoned.

Strain gage transducers such as are shown in the following Statham patents, employed as pressure transducers, have the reference volume filled with low pressure helium, to reduce the deleterious thermal effects resulting from the heating of the wires by the current applied to the wires. These patents are as follows: 2,778,624, 2,622,176, 2,453,549 and 2,840,675.

The above transducers are known as unbonded strain gage transducers. Other transducers also applicable as pressure transducers employ bonded type strain gages attached to flexures which are deflected by reason of the applied pressure. In all of these transducers the pressure is applied to a force summing means such as a diaphragm.

As is well known, the pressure applied to the pressure gage is translated into a strain in the wires, to change their resistance. The wires are connected into a Wheatstone bridge configuration. The current which passes through the bridge from the excitation source causes a heating of the wires, resulting in a shift in the balance of the bridge at zero pressure, and has other deleterious effects.

The introduction of a small amount of helium, the magnitude depending on the pressure in the reference volume, effectively minimizes the deleterious effects of this heating. It has, however, as I have found, the disadvantage that the pressures of helium in the transducers of the above type, required to obtain the above effect, cause a substantial reduction in the insulation to ground of the electrical terminals and the wires. This becomes a serious problem when relatively high voltages are laced between the input connections to the bridge and ground.

In many applications it is desired to test the transducer and systems in which the transducer is placed, to be sure that there are no shorts between the current input terminals which excite the bridge and the ground, i.e., the case of the transducer. This is done usually by applying a high voltage between the case and the input terminals of the transducer. It is desired that ideally this constitutes an open circuit, but in practical effect it has been found sufficient that the leakage current shall be of the order of about one-half milliampere, at voltages in the neighborhood of 300 to 400 volts, at 60 cycles.

It has been found that, employing helium in the reference volume, in the ranges of about .1 to about 20 p.s.i.a., in transducers used as pressure gages for pressures ranging from about 1 pound up to 5,000 pounds, the voltage at which the above leakage current occurs is so high that a false indication of a short occurs at voltages as stated above.

I have now found that, if I add to the helium a small amount of a fluorocarbon gas at partial pressure which is substantially less than the partial pressure of the helium in the reference volume, the insulation value of the gas in the reference volume becomes sufficiently high so that, at suitably high test voltages, the leakage current will be not more than a suitable level. In such systems the transducers may be tested at suitable voltage levels and, if not shorted for other reasons, will not show an undesired current flow through the gas.

It is, therefore, an object of my invention to produce electrical resistance strain wire pressure transducers in which the reference volume is filled with low pressure helium containing a fluorocarbon at a partial pressure substantially less than the partial pressure of the helium, the total pressure being in the range of from about 0.01 to about 20 p.s.i.a., and the partial pressure of the helium may be in the range of from about 1000 to about 10 times the partial pressure of the fluorocarbon. In low pressure gages, for example, gages in the range of 0 to 200 p.s.i.a., where the total pressure in the reference volume is composed substantially entirely of helium at pressures in the range of about .1 to about 1 p.s.i.a., the partial pressure of the fluorocarbon may range from about 0.001 to about .1 p.s.i.a, a suitable partial pressure of the fluorocarbon being within the range of about .01 to about .05 p.s.i.a.

These and other objects of my invention will be more fully described by reference to the drawing, of which:

FIG. 1 shows one type of pressure transducer, that shown in Statham Patent 3,058,348, which is here shown merely for illustrative purposes. It must be remembered that any pressure transducer in which a sealed reference volume may be employed may be used.

In FIG. 1, 1 is the case, which is hermetically and rigidly connected to the pressure input adapter 2. A diaphragm 3 is connected to the inlet adapter 2, and sealed at the edges of the diphragm. A post 9 is connected to the center of the diaphragm. The case carries a frame 5, in the form of a plate, which is supported upon the pressure input adapter 2. The plate carries two insulated posts 8 and two springs mounted on insulated posts 6'. The wires 7 are connected to posts 8 and to the springs 6 and to a post 9'.

The metallic springs 6 are connected to terminals 10', and the insulated posts 8 and 9' are also connected to suitable terminals 10', as is fully disclosed in the said Statham patent. The reverse side of the frame 5 carries a similar wire arrangement. The wires are connected into a form of Wheatstone bridge, as shown in FIG. 2, by suitable connections to the terminals 10' and to the terminals 10, as is fully disclosed in said Statham patent.

The case carries a terminal cover 16, carrying the terminal connections 10, and has a sealing plate 17, carrying solid terminals 18 to which the conductor wires are connected, and has a central opening 19. The central opening 19 in position with the case 16 removed, the transducer is introduced into a vacuum chamber. A suitable gas or mixture of gases is introduced through the opening 19, which is sealed with a solder or a weld seal at 21, to hold the gas under suitable pressure in the reference volume 4. The cover 16 is then placed on the case.

To test the transducer to determine the voltage at which a current flow of ½ milliampere or any other suitable amperage will flow from the terminals 10 and the conductor 11 through the wires 7 to the case 1, through the gas in the reference volume 4, the terminals 10 are connected together, as shown in FIG. 2, and the case is connected through a resistance 13 to a potential source 12. Suitable voltage is applied at 12 and the current measured by measuring the potential drop across the resistance 13.

In such a transducer, in which the evacuated reference volume 4 is filled with helium alone, the voltage at which the .5 milliampere flows is given in the following table. In column 1 is given the pressure of the helium in the reference volume 4. Column 2 is the voltage at which a current flow of .5 milliampere occurs through the resistance 13, at 60 cycles applied at 12, with helium only at the indicated pressure. Column 3 is the voltage for such current flow, when 0.02 p.s.i.a. of CClF₃ is added to the helium in the reference volume 4, to give a total pressure as indicated in column 1.

TABLE I

| P.s.i.a. | Helium only | Helium and CClF₃ |
|---|---|---|
| .01 | 350 | |
| .02 | 310 | |
| .03 | 275 | |
| .1 | 240 | |
| .2 | 210 | |
| .3 | 200 | 350 |
| .4 | 200 | |
| .5 | 200 | 350 |
| 1 | 200 | |
| 2 | 225 | |
| 3 | 225 | |
| 4 | 250 | |
| 5 | 250 | |
| 7 | 275 | 375 |
| 20 | 325 | 380 |

It will be seen that a significant increase in the insulating value is obtained. This is particularly important in the regions of .1 to .5 p.s.i.a., where the reference volume is under low pressure as in absolute pressure gages. In all such pressure gages it is desired that the pressure in the reference volume be as small a fraction as possible of the minimum pressure which the gage is to report.

It will be seen that a significant increase in the resulting voltage at which .5 milliampere flow is obtained results when the fluorocarbon gas is added to the helium. This is particularly important in the regions of about .1 to .5 p.s.i.a., as used in low pressure and medium pressure absolute pressure gages in the range of 1 to 200 p.s.i.a. necessary in order that the pressure in the reference volume dose not introduce an unreasonable stiffness into the system and does not raise the pressure required to move the bridge unbalance from zero.

In all such pressure gages it is desired that the pressure in the reference volume be as small a fraction of the total pressure which the gage is to report, whether it be high or low pressure, that is, whether from 1 to 5,000 pounds.

The fluorocarbons which I may use include:

Trifluorochloromethane _____ CClF₃
Octofluorocyclobutane _____ C₄F₈
Hexafluoroethane _____ C₂F₆ and mixtures thereof.

I prefer to employ CClF₃ or C₂F₆ or mixtures thereof. Of these, C₂F₆ is the preferred fluorocarbon, since it is the most stable under the above conditions.

I may thus employ the above gases together with helium at a total pressure of from about .1 to about 5 p.s.i.a., in which the partial pressure of the fluorocarbon gas is from about 0.01 to about .5 p.s.i.a., and in which the total pressure is not in excess of about 1% of the lowest pressure which the gage is intended to report.

While I have described a particular embodiment of my invention for the purpose of illustration, it should be understood that various modifications and adaptations thereof may be made within the spirit of the invention, as set forth in the appended claims.

I claim:

1. A pressure transducer comprising a case, a force transmitting flexure, a sealed reference volume, an electrical resistance strain wire mounted in said reference volume and operatively connected to said flexure, helium in said reference volume, a fluorocarbon gas in said reference volume at a partial pressure substantially less than the pressure of said helium, the total pressure in said reference volume being substantially equal to the pressure of said helium and said fluorocarbon.

2. The transducer of claim 1, in which the fluorocarbon is CClF₃.

3. The transducer of claim 1, in which the fluorocarbon is C₂F₆.

4. The transducer of claim 1, in which the partial pressure of the helium is in the range of from about 1000 to about 10 times the partial pressure of the fluorocarbon, and the total pressure in the reference volume is substantially equal to the pressure of said helium and said fluorocarbon.

5. The transducer of claim 4, in which the fluorocarbon is CClF₃.

6. The transducer of claim 4, in which the fluorocarbon is C₂F₆.

7. The transducer of claim 1, in which the partial pressure of the helium is from about .1 to about .5 and the partial pressure of the fluorocarbon is from .01 to .05 p.s.i.a., the total pressure in said reference volume being substantially equal to the pressure of said fluorocarbon and said helium.

8. The transducer of claim 7, in which the fluorocarbon is CClF₃.

9. The transducer of claim 7, in which the fluorocarbon is C₂F₆.

References Cited

UNITED STATES PATENTS 3,058,348  10/1962  Statham _____ 338—4
3,242,448  3/1966   Paine et al. _____ 338—4

RICHARD M. WOOD, *Primary Examiner.*

W. D. BROOKS, *Assistant Examiner.*